United States Patent
Tarantino et al.

(10) Patent No.: US 9,958,880 B2
(45) Date of Patent: May 1, 2018

(54) WIRELESS VALVE ACTUATOR SYSTEM AND METHOD

(71) Applicant: FISHER CONTROLS INTERNATIONAL LLC, Marshalltown, IA (US)

(72) Inventors: Andrea Tarantino, Monza (IT); Federico Luigi Mastropietro, Milan (IT); Filippo Dordoni, Gossolengo (IT)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 217 days.

(21) Appl. No.: 14/933,918

(22) Filed: Nov. 5, 2015

(65) Prior Publication Data
US 2017/0075365 A1     Mar. 16, 2017

Related U.S. Application Data

(60) Provisional application No. 62/219,251, filed on Sep. 16, 2015.

(51) Int. Cl.
*G05B 15/02*     (2006.01)
*G05D 16/20*     (2006.01)
(Continued)

(52) U.S. Cl.
CPC ........ *G05D 16/202* (2013.01); *F15B 11/0725* (2013.01); *G05B 15/02* (2013.01);
(Continued)

(58) Field of Classification Search
CPC ................ F15B 11/072; F15B 11/0725; F15B 13/0426; F15B 13/0431; F15B 21/08;
(Continued)

(56) References Cited

U.S. PATENT DOCUMENTS 6,108,967 A * 8/2000 Erickson ................ A01B 79/02
                                                                47/1.01 R
8,836,790 B1* 9/2014 McMillan ............... G06F 21/00
                                                                348/143
(Continued)

FOREIGN PATENT DOCUMENTS

DE          3331746 A1      3/1984
DE         20119416 U1      4/2003
(Continued)

OTHER PUBLICATIONS

Emerson Process Management, TopWorx™ 4310 Wireless Position Monitor, Product Bulletin 62.3:4310, 12 pages (Jul. 2014), United States.

(Continued)

*Primary Examiner* — Abdelmoniem Elamin
(74) *Attorney, Agent, or Firm* — Marshall, Gerstein & Borun LLP (57) ABSTRACT

A gas-over-oil actuator system for use with a valve in a natural gas pipeline. The system includes a gas-over-oil actuator and a wireless position monitor operatively coupled to the gas-over-oil actuator. The wireless position monitor includes an integral opened spool valve and is adapted to be communicatively coupled to a remote workstation via a wireless network and a wireless gateway. At least one switching relay is operatively coupled to the gas-over-oil actuator and the wireless position monitor. Upon receiving a wireless command from the remote workstation, the wireless position monitor drives a pressure signal from the opened center spool valve to the at least one switching relay to manage high pressure supply to the gas-over-oil actuator and move the valve to a desired position.

29 Claims, 6 Drawing Sheets

(51) Int. Cl.
  *F15B 11/072* (2006.01)
  *F15B 13/042* (2006.01)
  *F15B 13/043* (2006.01)
  *F15B 21/08* (2006.01)

(52) U.S. Cl.
  CPC ......... *F15B 11/072* (2013.01); *F15B 13/0426* (2013.01); *F15B 13/0431* (2013.01); *F15B 21/08* (2013.01); *F15B 2211/212* (2013.01); *F15B 2211/216* (2013.01); *F15B 2211/30525* (2013.01); *F15B 2211/6355* (2013.01); *F15B 2211/895* (2013.01)

(58) Field of Classification Search
  CPC .......... F15B 2211/212; F15B 2211/216; F15B 2211/30525; F15B 2211/6355; F15B 2211/895; G05B 15/02; G05D 16/202
  See application file for complete search history.

(56) References Cited

U.S. PATENT DOCUMENTS

| | | | |
|---|---|---|---|
| 9,057,453 B2* | 6/2015 | Pitchford | F16K 31/082 |
| 9,089,077 B2* | 7/2015 | Ballantine | H05K 7/20763 |
| 9,377,035 B2* | 6/2016 | Gaarder | F15B 13/0846 |
| 9,689,534 B2* | 6/2017 | Deville | F17D 5/02 |
| 9,695,988 B2* | 7/2017 | Deville | F17D 5/02 |
| 2011/0140908 A1* | 6/2011 | Kosht | H04Q 9/00 340/870.02 |
| 2013/0055885 A1* | 3/2013 | Gaarder | F15B 13/0846 91/358 R |
| 2013/0125664 A1* | 5/2013 | Harper, Jr. | G01F 1/28 73/861.08 |
| 2014/0144530 A1 | 5/2014 | Miller | |

FOREIGN PATENT DOCUMENTS

| | | |
|---|---|---|
| EP | 2853793 A1 | 4/2015 |
| WO | WO-2001/71198 A2 | 9/2001 |
| WO | WO-2013/098800 A1 | 7/2013 |
| WO | WO-2015/104926 A1 | 7/2015 |

OTHER PUBLICATIONS

Emerson Process Management, Fisher™ 4320 Wireless Position Monitor with On/Off Control Option, Instruction Manual D103621X012, 68 pages (Feb. 2016), United States.

Emerson Process Management, FloBoss™ 107 Flow Manager Instructions Manual, Part D301232X012, Form No. A6206, 152 pages (Dec. 2015), United States.

Emerson Process Management, TopWorx™ Discrete Valve Controllers Position Monitoring and Control of Automated On/Off Valves brochure, 32 pages (2015), United States.

International Search Report and Written Opinion, corresponding to International Application No. PCT/US2016/052056, dated Jan. 9, 2017.

* cited by examiner

WIRELESS VALVE ACTUATOR SYSTEM AND METHOD

FIELD OF THE DISCLOSURE

The present invention relates generally to valve actuator systems, and more specifically, to a wireless gas-over-oil actuator system and method for use with a valve in a natural gas pipeline.

BACKGROUND OF THE DISCLOSURE

Gas-over-oil actuators (also called gas/hydraulic actuators or gas powered actuators) are typically installed on valves, such as isolating valves, in a natural gas distribution pipeline and used to control the valves with high-pressure natural gas. For example, the gas-over-oil actuator may be powered by natural gas pressure taken directly from the natural gas pipeline, e.g., 75 bar. In this conventional system, all electrical equipment must be certified for the specific hazardous area, as does any electrical connection between a control room and the gas-over-oil actuator.

Figure 1A:
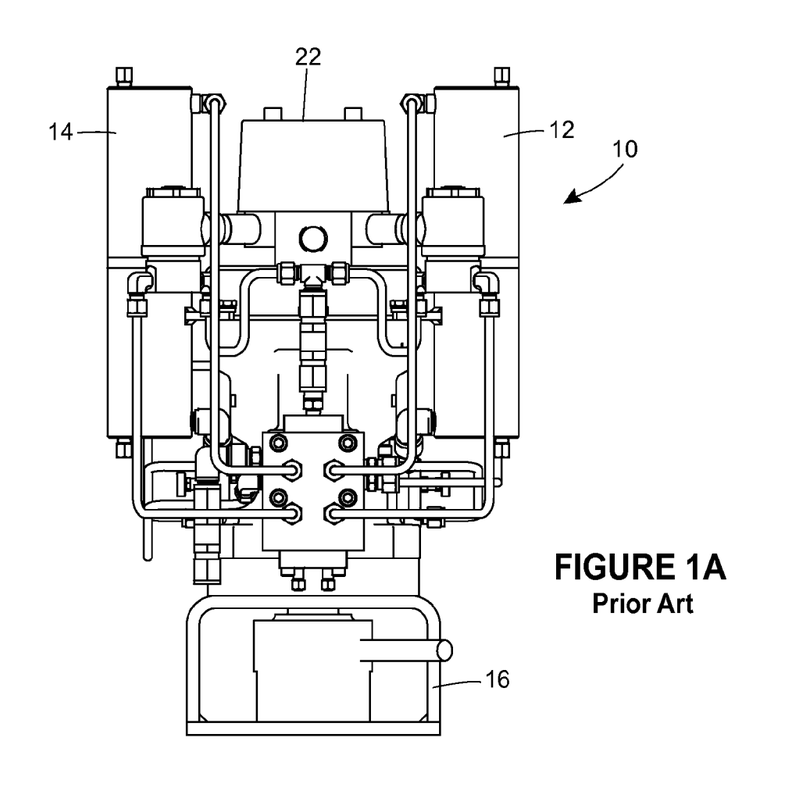
FIG. 1A is a front schematic view of a conventional gas-over-oil actuator.
Figure 1B:
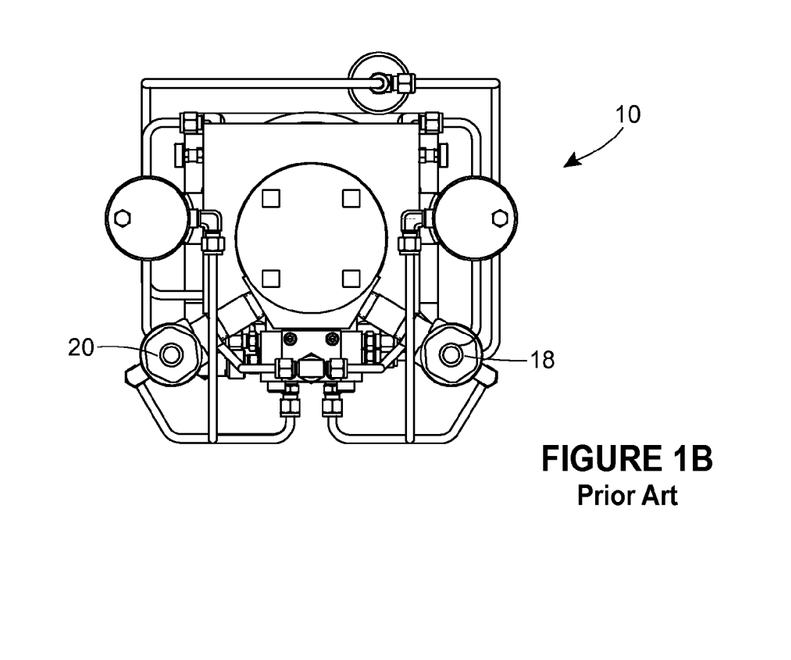
FIG. 1B is a top schematic view of the conventional gas-over-oil actuator of FIG. 1A.

In one example, and referring now to FIGS. 1A and 1B, a conventional gas-over-oil actuator 10 includes an open side gas hydraulic tank 12, and a closed side gas hydraulic tank 14. A mounting bracket 16 may be used to install the gas-over-oil actuator 10 on a valve disposed in a natural gas pipeline (not shown).

As depicted in FIG. 1B, the gas-over-oil actuator 10 further includes an opening solenoid valve 18 and a closing solenoid valve 20, both of which may be installed on an actuator control, for example. A command, such as an open/close command, from wired powered inputs, e.g., two different 24 VDC, are sent to the opening solenoid valve 18 and the closing solenoid valve 20 to control and operate the valve. In addition, a limit switch 22 (FIG. 1A) is installed on top of the gas-over oil-actuator 10 and is used for an open/closed position feedback. Two different wired signals are used as open/closed position feedback.

In addition, two different manual override systems, the oil override system (not shown) and the solenoid valve manual override system (not shown), are typically installed on the gas over-oil actuator 10. The oil override system moves the valve if the pipeline is empty or if the natural gas pressure is insufficient. The solenoid valve manual override system moves the valve if the electrical equipment or power supply fails.

The gas-over-oil actuator 10 can be remotely operated by local electric pushbuttons or from a main dispatching center. In one example, one or more lights on a control panel (HSV) may depict the open/closed valve position, and the electrical control panel (HSV) is located in a safe area. In some plant layout configurations, two pressure transmitters are also installed in the pipeline, one upstream and the other downstream the valve. The pressure transmitters monitor the gas pressure in the pipeline and verify any gas leakage once the valve is in a closed position, for example.

In the foregoing conventional system, all the instruments installed in the plant are physically wired with armored cables and cable glands, for example, to the control panel installed in the control room. Due to inherent porosity of cable insulation layers, permeation phenomena has been experienced. In addition, all electric wiring is arranged by implementing suitable trays along the cable paths to prevent mechanical stress.

SUMMARY OF THE DISCLOSURE

In accordance with a first exemplary aspect of the disclosure, a gas-over-oil actuator system for use with a valve in a natural gas pipeline is disclosed and includes a gas-over-oil actuator and a wireless position monitor operatively coupled to the gas-over-oil actuator. The wireless position monitor has an integral open center spool valve and is adapted to be communicatively coupled to a remote workstation. At least one switching relay is operatively coupled to the gas-over-oil actuator and the wireless position monitor. The at least one switching relay receives a signal from the opened center spool valve of the wireless position monitor. Upon wirelessly receiving a command from the remote workstation, the wireless position monitor drives a signal from the opened center spool valve to the at least one switching relay to manage pressure supply to the gas-over-oil actuator and to move the valve to a desired position.

According to another exemplary aspect of the present disclosure, a process control system comprises a valve installed in a natural gas pipeline and a gas-over-oil actuator system operatively coupled to the valve. The gas-over-oil actuator system includes a gas-over-oil actuator and a wireless position monitor operatively coupled to the gas-over-oil actuator. The wireless position monitor has an integral pneumatic pilot valve. In addition, at least one switching relay is operatively coupled to the gas-over-oil actuator and the wireless position monitor, the at least one switching relay for receiving a signal from the pneumatic pilot valve of the wireless position monitor. The process control system further comprises a workstation having a controller communicatively coupled to the wireless position monitor via a wireless network. Thus, upon receiving a command from the controller via the network, the wireless position monitor drives a signal from the pneumatic pilot valve to the at least one switching relay to manage pressure supply to the gas-over-oil actuator, moving the valve to a desired position.

According to a further exemplary aspect of the present disclosure, a wireless actuator system for use with a valve in a natural gas pipeline is disclosed. The wireless actuator system comprises an actuator adapted to be operatively coupled to a valve disposed in a natural gas pipeline and a wireless position monitor operatively coupled to the actuator. The wireless position monitor has an integral opened center spool valve and is adapted to be communicatively coupled to a remote workstation via a wireless network. At least one switching relay is operatively coupled to the actuator and the wireless position monitor. The at least one switching relay is for receiving a pressure signal from the opened center spool valve of the wireless position monitor. Upon receiving a wireless command from the remote workstation, the wireless position monitor drives the pressure signal from the opened center spool valve to the at least one switching relay to manage pressure supply to the actuator and move the valve to a desired position.

In yet another exemplary aspect of the present disclosure, a method of operating a valve disposed within a natural gas pipeline is disclosed. The method comprises integrating a wireless position monitor into an actuator operatively coupled to the valve, the wireless position monitor communicatively coupled to a workstation via a wireless network, and transmitting, via one or more transmitters, a command from a controller of the workstation to the wireless position monitor via the wireless network. The method further includes sending a pressure signal from a pneumatic pilot valve of the wireless position monitor to at least one switching relay upon receiving the command, the at least one switching relay operatively coupled to the wireless position monitor and the actuator. The method further includes managing a high pressure supply to the actuator via the at least one switching relay to move the valve to a desired position in response to the pressure signal received from the pneumatic pilot valve.

In further accordance with any one or more of the exemplary aspects, the gas-over-oil actuator system, the process control system and/or the actuator system of the present disclosure may include any one or more of the following further preferred forms.

In some preferred forms, the remote workstation may include the remote workstation comprising one or more of a controller, a network gateway communicatively coupled to the controller, a laptop coupled to the network gateway, a control panel operatively coupled to the controller, and an LCD screen operatively coupled to the controller. In addition, the gas-over-oil actuator may further comprise a first gas/oil tank, a second gas/oil tank, and a manual override system disposed adjacent to and between the first and second gas/oil tanks. In addition, the system may include an open switching relay and a closed switching relay, the open and closed switching relays operatively coupled to the gas-over-oil actuator and the wireless position monitor. Further, the gas-over-oil actuator may further comprise a first tank and a second tank, the first tank in communication with the open switching relay and the second tank in communication with the closed switching relay, and each of the open and closed switching relays may include a vent.

In some other preferred forms, the signal from the opened center spool valve driven to the at least one switching relay is a low pressure signal, and the pressure supply to the gas-over-oil actuator is a high pressure supply. In another example, the signal from the opened center spool valve driven to the at least one switching relay is a high pressure signal, and the pressure supply to the gas-over-oil actuator is the same pressure level as the high pressure signal.

In some preferred forms, the system further includes a pressure regulator operatively coupled to the wireless position monitor. The pressure regulator may have a relief valve and may limit the inlet pressure from the natural gas pipeline to the opened center spool valve of the wireless position monitor. In addition, the at least one switching relay may include a manual override to allow local manual operation if the wireless position monitor fails.

In other preferred forms, the system further includes at least one solenoid valve disposed external to and operatively coupled to the wireless position monitor, the at least one solenoid valve driven by the wireless position monitor to provide high pressure gas supply from the natural gas pipeline through the opened center spool valve and into the at least one switching relay.

Also, a bleed valve may be included for maintaining the at least one switching relay in an open position for a time required by the valve to complete a desired travel distance. In one example, the bleed valve may have a locking nut to prevent tampering and may further be disposed within a lockable cabinet.

In still other preferred forms, the system may further comprise at least one torque limiting device disposed between the wireless position monitor and the at least one switching relay to prevent excess torque from the gas-over-oil actuator.

Additional optional aspects and features are disclosed, which may be arranged in any functionally appropriate manner, either alone or in any functionally viable combination, consistent with the teachings of the disclosure. Other aspects and advantages will become apparent upon consideration of the following detailed description.

BRIEF DESCRIPTION OF THE DRAWINGS

The Figures described below depict various aspects of the system and methods disclosed therein. It should be understood that each figure depicts an example of a particular aspect of the disclosed system and methods, and that each of the figures is intended to accord with a possible example thereof. Further, wherever possible, the following description refers to the reference numerals included in the following figures, in which features depicted in multiple figures are designated with consistent reference numerals.

There are shown in the drawings arrangements which are presently discussed, it being understood, however, that the present examples are not limited to the precise arrangements and instrumentalities shown, wherein.

DETAILED DESCRIPTION OF THE DISCLOSURE

Generally, a gas-over-oil actuator system for use with a valve in a natural gas pipeline is disclosed. The gas-over-oil actuator system includes a gas-over-oil actuator and a wireless position monitor operatively coupled to the gas-over-oil actuator. The wireless position monitor includes an integral opened spool valve and is communicatively coupled to a remote workstation via a wireless network. The system further includes at least one switching relay operatively coupled to the gas-over-oil actuator and the wireless position monitor.

Upon receiving a command from the remote workstation via the wireless network, the wireless position monitor drives a pressure signal from the opened center spool valve to the at least one switching relay to manage pressure supply to the gas-over-oil actuator and to move the valve to a desired position without any hardwired connection. In other words, the new gas-over-oil actuator system allows wireless, remote operation of the valve without any hardwired connection needed to maintain all the functionality of the conventional wired system. The new gas-over-oil actuator system further allows acquisition and feedback of one or more of the valve or actuator, as explained in more detail below.

Figure 2:
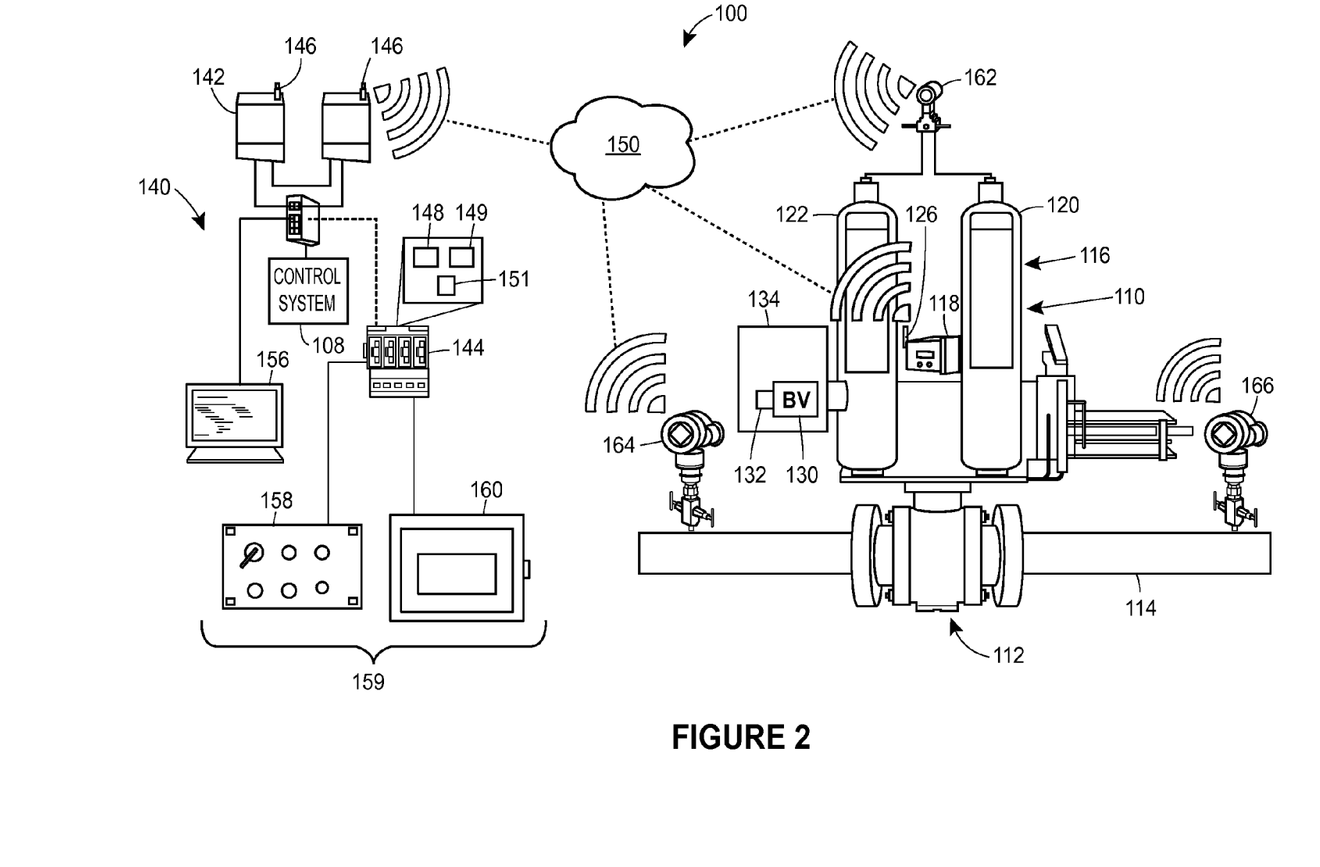
FIG. 2 is a perspective view of a process control system including a wireless gas-over-oil actuator system of the present disclosure.

Referring now to FIG. 2, a process control system 100 includes a gas-over-oil actuator system 110 operatively coupled to a valve 112 installed or disposed in a natural gas pipeline 114. The gas-over-oil system 110 includes a gas-over-oil actuator 116 and a wireless position monitor 118 operatively coupled to the gas-over-oil actuator 116. The wireless position monitor 118 replaces the limit switches of conventional systems and monitors the valve 112 position using a magnetic linkage system. In one example, and as depicted in FIG. 2, the gas-over-oil actuator 116 includes first gas/oil tank 120, and a second gas/oil tank 122, and the wireless position monitor 118 is disposed between the first and second gas/oil tanks 120, 122. This position of the wireless position monitor 118 helps the wireless position monitor 118 measure differential pressure across the gas-over-oil actuator 116, such as a piston of the gas-over-oil actuator 116.

In one example, the wireless position monitor 118 is a Fisher 4320/TopWorx 4310 Wireless Position Monitor with on/off control option. The integrated diagnostic capability of the Fisher 4320/TopWorx 4310 Wireless Position Monitor, such as feedback in percentage of travel, close time, open time, and alerts, allows acquisition and feedback of both the valve 112 and the gas-over-oil actuator 116 travel position and stroking time. In addition, the Fisher 4320/TopWorx 4310 Wireless Position Monitor can raise alarms and/or warnings according to customer requirements. While the Fisher 4320/TopWorx 4310 Wireless Position Monitor is the wireless position monitor 118 of the process control system 100 in one example, one of ordinary skill in the art will appreciate that other wireless position monitors may alternatively be used and still fall within the scope of the present disclosure.

The wireless position monitor 118 includes an integral pneumatic pilot valve 123 (FIG. 3A), such as an opened center spool valve, and one or more of an antenna 126 or a network interface (not shown) for receiving signals from a remote source via a wireless network, as explained in more detail below. The wireless position monitor 118 further includes at least one switching relay 124 (FIG. 3A) operatively coupled to the gas-over-oil actuator 116 and the wireless position monitor 118. The at least one switching relay 124 receives a signal from the pneumatic pilot valve 123, such as an opened center spool valve 123, to manage pressure supply to the gas-over-oil actuator 116, as also explained more below relative to FIG. 3A.

The gas-over-oil actuator system 110 may further include a bleed valve 130 for maintaining the at least one switching relay 124 (FIG. 3A) in a desired position, such as an open position or a closed position, for a time required by the valve 112 to complete a desired travel distance, for example. The bleed valve 130 may include a locking nut 132 to prevent tampering and is disposed within a lockable cabinet 134. In one example, the lockable cabinet 134 having the bleed valve 130 is disposed adjacent to the second gas/oil tank 122 of the gas-over-oil actuator 116.

When the valve 112 does not complete the desired travel distance and a value of torque is acceptable, the wireless position monitor 118 may again send the pressure signal to the at least one switching relay 124 to complete the travel. Alternatively, an alert message may be sent to the LCD or other display, such that the message reads "Alert: Valve Not in Correct Position," for example.

The process control system 100 further includes a workstation 140 having at least one wireless gateway 142, such as a Fisher Smart Wireless Gateway 1410/1420. The Fisher Smart Wireless Gateway 142 connects WirelessHART self-organizing networks with host systems and data applications. The Smart Wireless Gateway also includes layered security to ensure any network stays protected. As further depicted in FIG. 2, a second or redundant "hot" backup gateway 142 is further provided in the event the first gateway 142 is compromised or fails. A controller 144 is operatively connected to the wireless gateway 142 via Modbus communications, in one example, and is further communicatively coupled to the wireless position monitor 118 via a wireless network 150. More specifically, the wireless gateway 142 may include one or more of at least one antenna 146, at least one transmitter, and at least one receiver for one or more of transmitting signals to and receiving signals from the wireless position monitor 118 via the wireless network 150. In one example, the controller 144 is a FloBoss FB107 controller and includes a processor 148, a memory 149 executable by the processor 148, and a transmitter 151. One of skill in the art will appreciate that the controller 144 may alternatively be various other controllers and may further be connected to the wireless gateway 142 via other communications and still fall within the scope of the present disclosure.

The workstation 140 of the process control system 100 may further include a laptop 156 coupled to the wireless gateway 142 via an Ethernet LAN, for example. In addition, and in some examples, a local control panel 158 may be operatively coupled to the controller 144 and a LCD screen 160, which may include a touch screen, and may also be operatively coupled to the controller 144 of the remote workstation 140. An operator may actuate one or more of a button or key on the laptop 156 or the local control panel 158, or a touchscreen of the LCD screen 160 to initiate a wireless open/close command from the controller 144 to the wireless position monitor 118 to operate the valve 112. In addition, the LCD screen may display diagnostic information and alarms for the operators. Further, and in one example, the remote workstation 140 may be disposed within one of a local control room 159 or a main dispatching center 159 and still fall within the scope of the present disclosure.

In addition, the workstation 140 further includes a central control system 108. As depicted in FIG. 2, for example, the control system 108 is operatively coupled to one or more of the wireless gateway 142, the controller 144, and the laptop 156. A user may initiate certain commands through the control system 108, for example, to remotely operate the gas-over-oil actuator system 110.

More specifically, upon receiving the command, such as an open/close command, from the controller 144 and/or the control system 108 via the wireless gateway 142 and the wireless network 150, the wireless position monitor 118 drives a pressure signal from the pneumatic pilot valve 123 (FIG. 3A) to the at least one switching relay 124. In one example, the signal is a low pressure signal, such as a low pressure signal of 7 bar. This allows the at least one switching relay 124 to manage the pressure supply to the gas-over-oil actuator 116 to move the valve 112 to a desired position and monitor the position of the valve 112. In addition, the pressure supply to the gas-over-oil actuator 116 is a high pressure supply, such as a high pressure supply of up to 75 bar.

In addition, to minimize battery drainage, the control command from the controller 144 may be maintained for only a few seconds, in one example. The bleed valve 130 is then set to maintain the at least one switching relay 124 in a desired position for a desired time.

As further depicted in FIG. 2, the process control system 100 may further include a differential pressure transmitter 162. The differential pressure transmitter 162 is operatively coupled to the gas-over-oil actuator 116 and may measure one or more of a differential pressure across the gas-over-oil actuator 116 or an opening torque of the valve 112, for example. The differential pressure transmitter 162 is further communicatively coupled to the workstation 140 via the wireless network 150 and the wireless gateway 142. This allows data acquisition and feedback relative to the differential pressure across the gas-over-oil actuator 118 and the operating torque of the valve 112, for example. In one example, a memory of the laptop 156 saves such data relative to the differential pressure of the gas-over-oil actuator 118 and the operating torque of the valve 112 and displays the data on a screen of the laptop 156 for further analysis.

In yet another example, the process control system 100 may further include a first pressure transmitter 164 disposed within the natural gas pipeline 114 upstream the valve 112 to measure pressure upstream the valve 112. In addition, a second pressure transmitter 166 may be disposed within the natural gas pipeline 114 downstream the valve 112 to measure pressure within the natural gas pipeline 114 downstream the valve 112. The first and second pressure transmitters 162, 164 are each communicatively coupled to the wireless gateway 142 of the workstation 140 via the wireless network 150. This allows data acquisition and feedback relative to the pressure in the natural gas pipeline 114 both upstream and downstream the valve 112, for example.

Figure 3A:
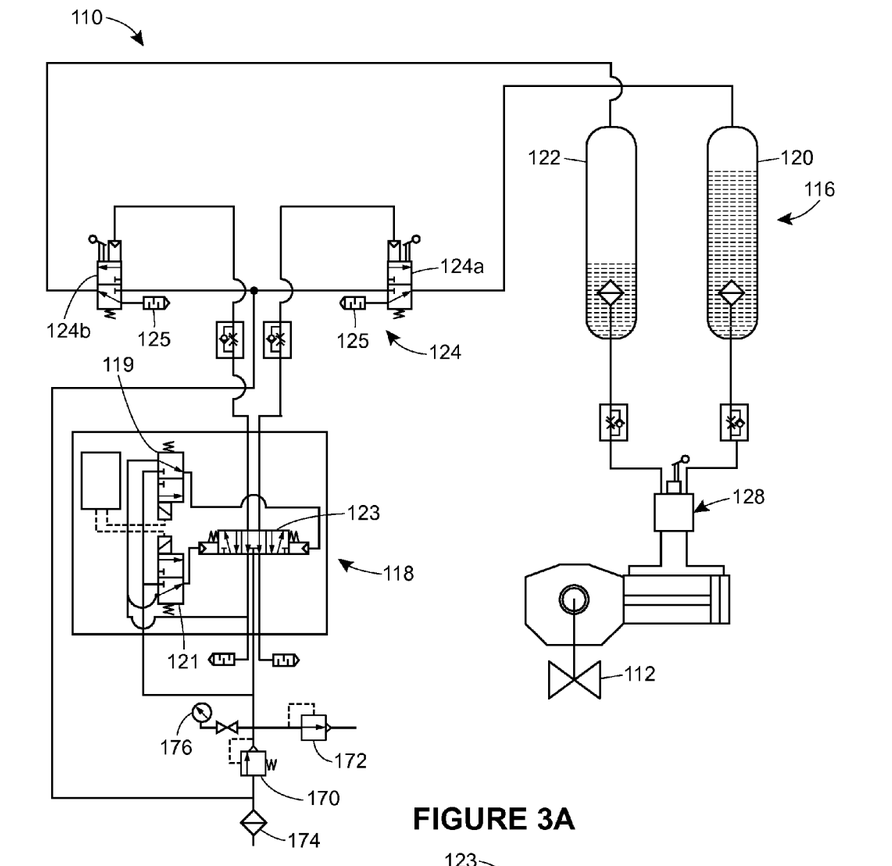
FIG. 3A is a schematic view of the gas-over-oil actuator system of FIG. 2.

Referring now to FIG. 3A, a schematic view of the gas-over-oil actuator system 110 of FIG. 2 is depicted. As also depicted in FIG. 2, the gas-over-oil actuator system 110 includes the gas-over-oil actuator 116 having the first gas/oil tank 120 and the second gas/oil tank 122. Each of the first and second gas/oil tanks 120, 122 are in fluid communication with a high pressure supply, such as a high pressure supply of up to 75 bar. A manual override system 128 is disposed adjacent to the first and second gas/oil tanks 120, 122.

The at least one switching relay 124 may include a closed switching relay 124a, which is in fluid communication with the first gas/oil tank 120, and an open switching relay 124b, which is in fluid communication with the second gas/oil tank 122. Each of the switching relays 124a, 124b includes a vent 125 and a manual override (not depicted) in the event the switching relays 124a, 124b fail.

The wireless position monitor 118 includes a first piezo valve 119, a second piezo valve 121, and a pneumatic pilot valve 123. In one example, the pneumatic pilot valve 123 is the opened center spool valve 123, a close up of which is depicted in FIG. 3B.

The opened center spool valve 123 of the wireless position monitor 118 is operatively coupled to a pressure regulator 170 that includes a relief valve 172. The pressure regulator 170 limits an inlet pressure from the pipeline 114 (FIG. 2) to the opened center spool valve 123 of the wireless position monitor 118. The opened center spool valve 123 allows low pressure gas, e.g., 7 bar, taken from the high pressure natural gas pipeline 114 by the pressure regulator 170 to flow through the spool valve 123 and into the switching relays 124a, 124b.

Figure 3B:
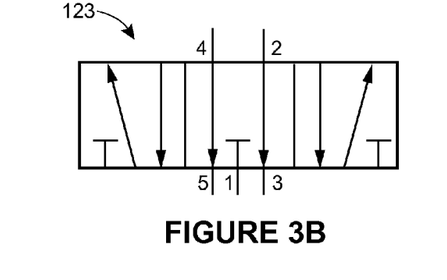
FIG. 3B is a schematic view of an enlarged opened center spool valve of the gas-over-oil actuator system of FIG. 3A.

As depicted in FIG. 3B, and in one example, the opened center spool valve 123 of the wireless position monitor 118 is a 5/3 opened center spool valve, as one of ordinary skill in the art will appreciate. The opened center configuration allows the low pressure signal from the pressure regulator 170 to flow through the spool valve 123 of the wireless position monitor 118 and into the first and second switching relays 124a, 124b. This allows the switching relays 124a, 124b to manage the high pressure supply to the gas-over-oil actuator 116 to ultimately operate and control the valve 112. Having a closed center spool valve, for example, would prevent the low pressure gas from the pressure regulator 170 to flow through the spool valve 123 and into the switching relays 124a, 124b and effective management of the high pressure gas supply to the gas-over-oil actuator 116.

In addition, because the power media of natural gas is taken directly from the pipeline 114, a filter 174 has been disposed adjacent to and in fluid communication with the pressure regulator 170 to protect downstream devices, for example. In yet another example, a pressure gauge 176 is disposed adjacent to the relief valve 172 to measure and display the low pressure supply, e.g., 7 bar, flowing from the pressure regulator 170 to the wireless position monitor 118 and the switching relays 124a, 124b.

Figure 4:
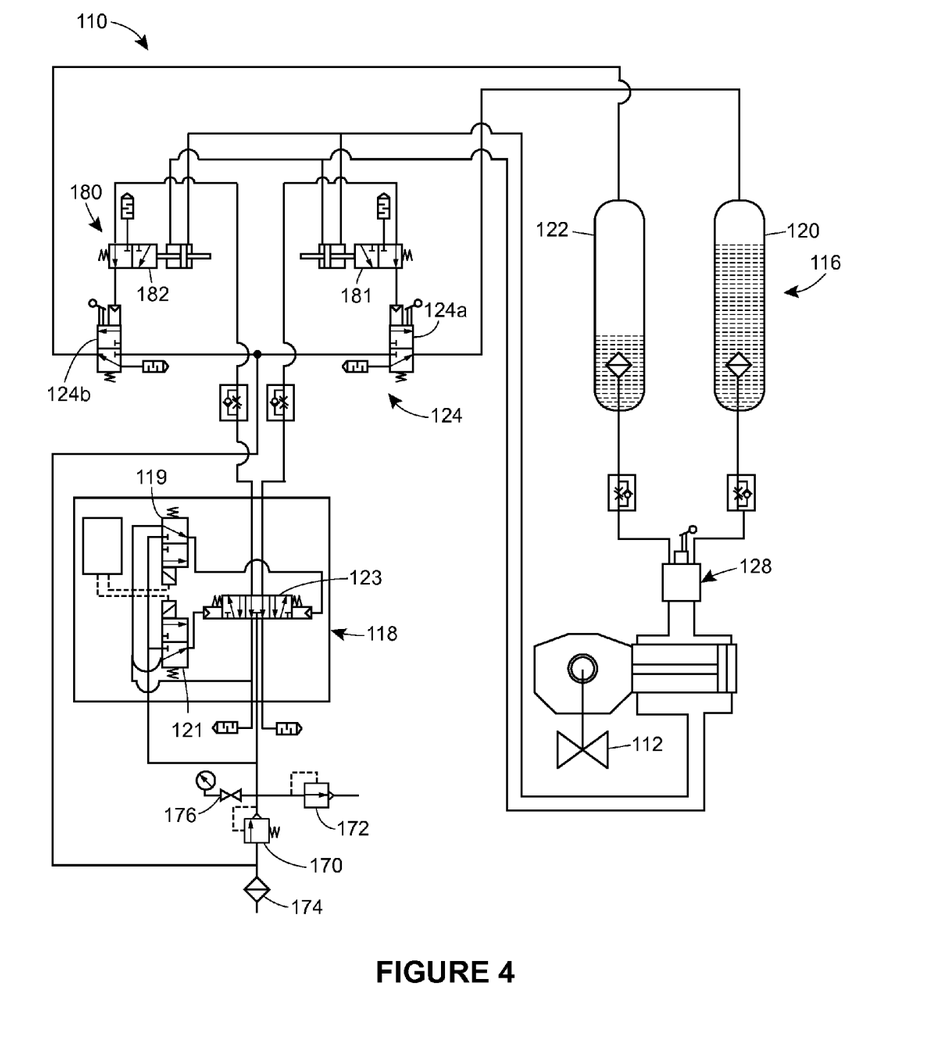
FIG. 4 is a schematic view of the gas-over-oil actuator system of FIG. 2 according to another aspect of the present disclosure, the-gas over-oil actuator system including at least one torque limiter.

In yet another example, the gas-over-oil actuator system 110 may further include at least one torque limiting device 180, as depicted in FIG. 4. More specifically, and for clarity, the gas-over-oil actuator system 110 of FIG. 4 is the gas-over-oil actuator system 110 of FIG. 3A, further including the at least one torque limiting device 180. For example, a first torque limiting device 181 may be disposed between the wireless position monitor 118 and the first switching device 124a. In addition, a second torque limiting device 182 may be disposed between the wireless position monitor 118 and the second switching device 124b. In this manner, each of the first and second torque limiting devices 181, 182 prevents excess torque that may be developed by the gas-over-oil actuator 116.

Figure 5:
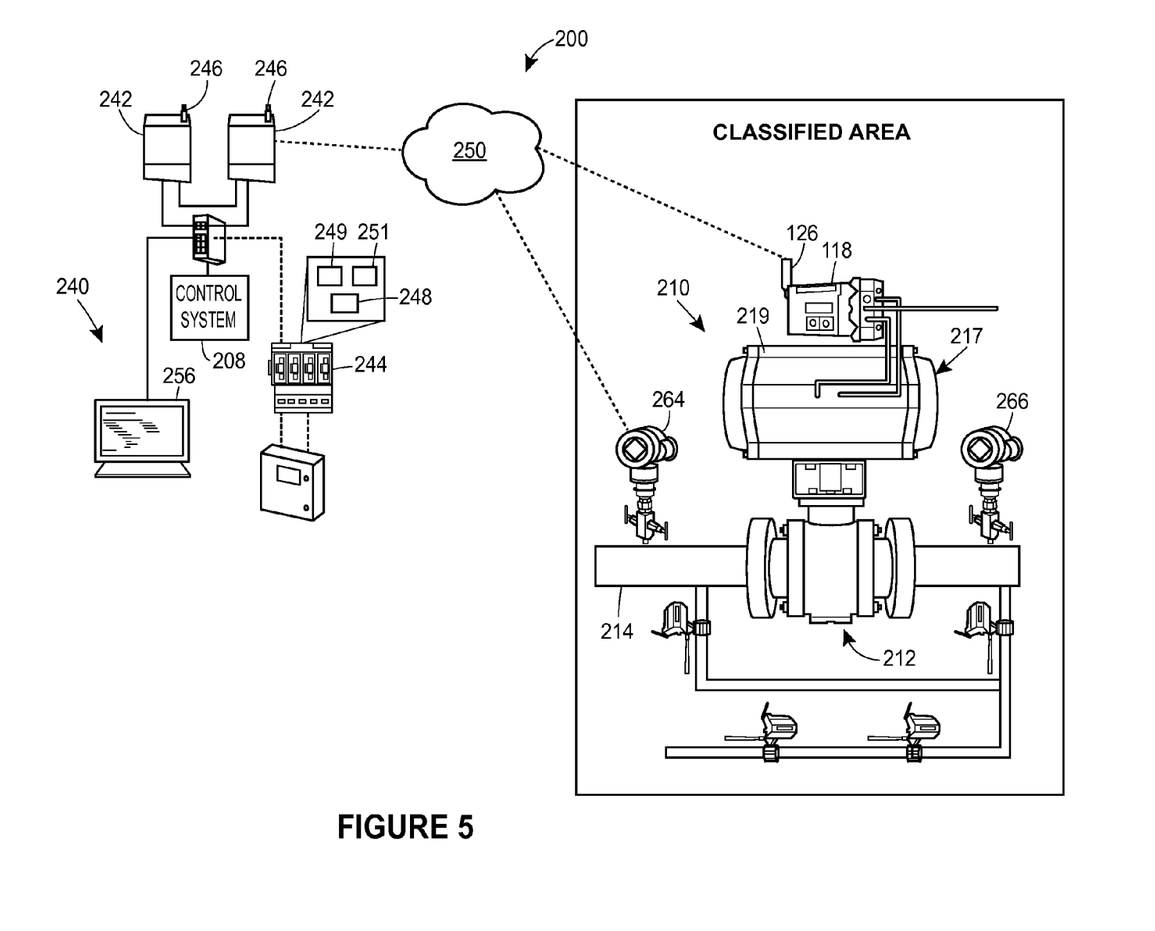
FIG. 5 is a perspective view of a wireless actuator system according to another aspect of the present disclosure.

Referring now to FIG. 5, another process control system 200 is depicted with another example wireless actuator system 210 operatively coupled to a valve 212 installed or disposed in a natural gas pipeline 214. The wireless actuator system 210 includes an actuator 217 and the wireless position monitor 118 operatively coupled to the actuator 217. In one example, the actuator 217 includes a housing 219, and the wireless position monitor 118 is disposed on the housing 219.

As described relative to the gas-over-oil actuator system 110 of FIGS. 2, 3A and 3B, the wireless position monitor 118 of the wireless actuator system 210 also includes the integral pneumatic pilot valve 123 (FIG. 3A), such as an opened center spool valve, and one or more of an antenna 126 or a network interface (not shown) for receiving signals from a remote source via a wireless network 250, as explained in more detail below. The wireless position monitor 118 further includes at least one switching relay 124 (FIG. 3A) operatively coupled to the actuator 217 and the wireless position monitor 118. The at least one switching relay 128 receives a signal from the pneumatic pilot valve 123, such as the opened center spool valve 123 in one example, to manage pressure supply to the actuator 217, as also explained more below.

Like the process control system 100 of FIG. 2, the process control system 200 also includes a workstation 240 having a wireless gateway 242, such as a Smart Wireless Gateway 1410/1420. A controller 244 is operatively coupled to the wireless gateway 242 and communicatively coupled to the wireless position monitor 118. More specifically, the wireless gateway 242 may include one or more of at least one antenna 246, at least one transmitter, and at least one receiver for one or more of transmitting signals to and receiving signals from the wireless position monitor 118 via a wireless network 250, such as a WirelessHART network. In one example, the controller 244 includes a processor 248, a memory 249 executable by the processor 248, and a transmitter 251. One of skill in the art will appreciate that the controller 244 may alternatively be various other controllers and still fall within the scope of the present disclosure.

The workstation 240 of the process control system 200 may further include a laptop 256 coupled to the wireless gateway 242. An operator may actuate one or more of a button or key on the laptop 256 or the controller 244 to initiate a wireless open/close command from the controller 244 to the wireless position monitor 118 to the actuator 217 to operate the valve 212. In addition, the remote workstation 240 may be disposed within one of a local control room 159 or a main dispatching center 159 and still fall within the scope of the present disclosure.

In addition, the workstation 240 may further include a central control system 208. As depicted in FIG. 5, for example, the control system 208 is operatively coupled to one or more of the wireless gateway 242, the controller 244, and the laptop 256. A user may initiate certain commands through the control system 208, for example, to remotely operate the gas-over-oil actuator system 210.

More specifically, and similar to the gas-over-oil actuator system 110 of FIG. 2, the wireless position monitor 118 drives a signal from the pneumatic pilot valve 123 (FIG. 3A) to the at least one switching relay 124 upon receiving the command from the controller 244 and/or the control system 208 via the wireless gateway 242 and the wireless network 250. In one example, the signal is a low pressure signal, such as a low pressure signal of 7 bar. This allows the at least one switching relay 124 to manage the pressure supply and the actuator 217 to move the valve 212 to a desired position and monitor the position of the valve 212. In another example, the actuator 217 is a high pressure supply, such as a high pressure supply in the range of 1 bar-75 bar.

Like the process control system 100 of FIG. 2, the process control system 200 depicted in FIG. 5 may also further include a first pressure transmitter 264 disposed within the natural gas pipeline 214 upstream the valve 212 to measure pressure upstream the valve 212. In addition, a second pressure transmitter 266 may be disposed within the natural gas pipeline 214 downstream the valve 212 to measure pressure within the natural gas pipeline 214 downstream the valve 212. The first and second pressure transmitters 264, 266 are each communicatively coupled to the wireless gateway 242 of the workstation 240 via the wireless network 250. This allows data acquisition and feedback relative to the pressure in the natural gas pipeline 214 upstream and downstream the valve 212, for example.

Figure 6A:
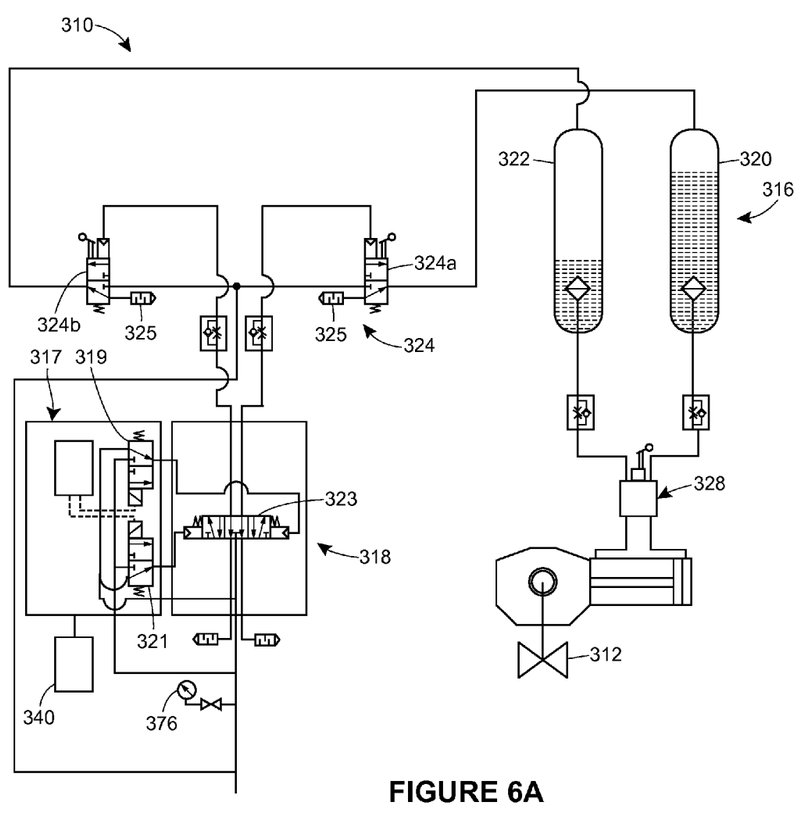
FIG. 6A is a schematic view of a gas-over-oil actuator system according to another aspect of the present disclosure.

In still another example, and referring now to FIG. 6A, a schematic view of the another exemplary gas-over-oil actuator system 310 according to the present disclosure is depicted. The gas-over-oil actuator system 310 may be operatively coupled to a valve 312, which may be installed or disposed in the natural gas pipelines 114, 214 depicted in FIGS. 2 and 5, respectively, for example. In addition, the gas-over-oil actuator system 310 may be operatively coupled to the workstation 140 via the wireless network 150 of the process control system 100 (FIG. 2), replacing the gas-over-oil actuator system 110 of FIG. 2. In another example, the gas-over-oil actuator system 310 may be operatively coupled to the workstation 240 of the process control system 200 (FIG. 5) via the wireless network 250, replacing the wireless actuator system 210 of FIG. 5, for example. In either case, the workstations 140, 240 operate relative to the gas-over-oil actuator system 310 in the same manner explained above relative to the gas-over-oil actuator system 110 or the wireless actuator system 210, respectively.

More specifically, and as depicted in FIG. 6A, the gas-over-oil actuator system 310 includes the gas-over-oil actuator 316 having the first gas/oil tank 320 and the second gas/oil tank 322. Each of the first and second gas/oil tanks 320, 322 are in fluid communication with a high pressure supply, such as a high pressure supply of up to 75 bar. A manual override system 328 is disposed adjacent to the first and second gas/oil tanks 120, 122.

The gas-over-oil actuator system 310 further includes at least one switching relay 324 having a closed switching relay 324a, which is in fluid communication with the first gas/oil tank 320, and an open switching relay 324b, which is in fluid communication with the second gas/oil tank 322. Each of the switching relays 324a, 324b includes a vent 325 and a manual override (not depicted) in the event the switching relays 324a, 324b fail.

Figure 6B:
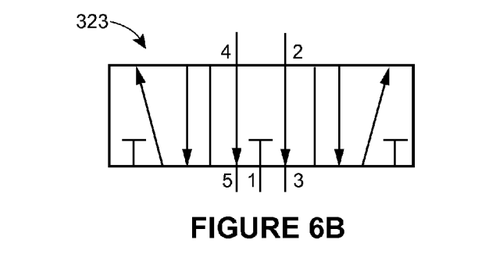
FIG. 6B is a schematic view of an enlarged opened center spool valve of the gas-over-oil actuator system of FIG. 6A.

The system 310 further includes a wireless position monitor 318 having a pneumatic pilot valve 323. In one example, the pneumatic pilot valve 323 is an opened center spool valve 323, a close up of which is depicted in FIG. 6B. As further depicted in FIG. 6A, and in this example, a solenoid valve system 317 is disposed external to the wireless position monitor 318 and is electrically wired to the wireless position monitor 318. Said another way, the solenoid valve system 317 is operatively coupled to the wireless position monitor 318 via physical wires. More specifically, the solenoid valve system 317 includes at least one solenoid valve, such as a first piezo valve 319 and a second piezo valve 321, both of which are directly wired to the wireless position monitor 318. In addition, the solenoid valve system 317 may also include an manual override system 340, as further depicted in FIG. 6A, which may be operated in the event the solenoid system 317 fails.

Unlike the opened center spool valve 123 of the wireless position monitor 118 depicted in FIG. 3A, the opened center spool valve 323 of the wireless position monitor 318 is not operatively coupled to any pressure regulator that limits an inlet pressure from the pipeline 114, 214 (FIGS. 2 and 5) to the opened center spool valve 323. Rather, upon receiving a command from the controller 144, 244 via the wireless network 150, 250, the wireless position monitor 318 drives the at least one solenoid valve of the solenoid valve system 317, such as the first and second piezo valves 319, 321, with a high pressure supply from the natural gas pipeline 114, 214. This high pressure supply from the at least one solenoid valve system 317 is driven through the open ended center spool valve 323 and into the at least one switching relay 324a, 324b. As a result, only one pressure level, which is the same pressure level as the gas pressure in the natural gas pipeline 114, for example, is used in the system 310. Said another way, the signal from the opened center spool valve 323 driven to the at least one switching relay 324a, 324b is a high pressure signal, and the pressure supply to the gas-over-oil actuator 316 is the same pressure level as the high pressure signal. As a result, no pressure regulator is required to step down and/or reduce the high pressure before going through the opened center spool valve 323, for example.

As depicted in FIG. 6B, and in one example, the opened center spool valve 323 of the wireless position monitor 318 is a 5/3 opened center spool valve, as one of ordinary skill in the art will appreciate. The opened center configuration allows the pressure signal from the first and second piezo valves 319, 321 and/or the at least one solenoid valve, to flow through the spool valve 323 of the wireless position monitor 318 and into the first and second switching relays 324a, 324b. This allows the switching relays 324a, 324b to manage the high pressure supply to the gas-over-oil actuator 316 to ultimately operate and control the valve 312. Having a closed center spool valve, for example, would prevent the pressure gas from flowing through the spool valve 323 and into the switching relays 324a, 324b and effective management of the high pressure gas supply to the gas-over-oil actuator 316.

In view of the foregoing, one of ordinary skill in the art will appreciate the following example method of operating the valve 112, 212, 312 within the natural gas pipeline 114, 214. More specifically, the method for operating the valve 112, 212, 312 within the natural gas pipeline 114, 214 includes integrating the wireless position monitor 118, 318 into the actuator 116, 217, 316 operatively coupled to the valve 112, 212, 312 the wireless position monitor 118, 318 communicatively coupled to the workstation 140, 240 via the wireless network 150, 250. The method further includes transmitting, via one or more transmitters 151, 251, a command from the controller 144, 244, such as an open/close command, to the wireless position monitor 118, 318 via the wireless gateway 142, 242 and the wireless network 150, 250.

The method still further comprises sending a pressure signal from the pneumatic pilot valve 123, 323 of the wireless position monitor 118, 318 to at least one switching relay 124, 124a, 124b, 324a, 324b upon receiving the command. The method further includes managing high pressure supply, e.g., up to 75 bar, to the actuator 116, 217, 316 via the at least one switching relay 124a, 124b, 324a, 324b to move the valve 112, 212, 312 to a desired position, e.g., an open position, a closed position, in response to the pressure signal received from the pneumatic pilot valve 123.

In addition, in one example, the method further comprises monitoring the position of one or more of the valve 112, 212, 312 or actuator 116, 217, 316 via the wireless position monitor 118, 318. In another example, monitoring the position of one or more of the valve 112, 212, 312 or actuator 116, 217, 316 via the wireless position monitor 118, 318 may comprise acquiring data relative to one of the valve 112, 212, 312 or the actuator 116, 217, 316 including data relative to a travel position or a stroke time, via the wireless position monitor 118, 318 the wireless network 150, 250, and the workstation 140, 240.

In yet another example, the method may further comprise maintaining the at least one switching relay 124, 324 in an open position for a time required by the valve 112, 212, 312 to complete a desired travel distance via the bleed valve 130 (FIG. 2). In addition, the method may further comprise limiting the inlet pressure from the natural gas pipeline 114, 214 to the pneumatic pilot valve 123 via the pressure regulator 170 operatively coupled to the wireless position monitor 118.

In still yet another example, the method may further comprise measuring one or more of the differential pressure across the actuator 116, 217, 316 or an operating torque of the valve 112, 212, 312 via the differential pressure transmitter 162 operatively coupled to the actuator 116. Still further, the method may comprise preventing excess torque from the actuator 116, 217 via the at least one torque limiting device 180 (FIG. 4) disposed between and operatively coupled to the wireless position monitor 118 and the at least one switching relay 124. In addition, the method may also comprise measuring pressure upstream and downstream the valve 112, 212 via the first pressure transmitter 164, 264 disposed upstream the valve 112, 212 and the second pressure transmitter 166, 266 disposed downstream the valve 112, 212, respectively.

Overall, one of ordinary skill in the art will appreciate the various advantages of the new wireless actuator system 110, 210, 310 and method. For example, the new system and method allows an on/off valve with an actuator, such as a gas-over-oil actuator 116, 316 to be moved using the wireless pneumatic position monitor 118, 318 that is powered by natural gas from the natural gas pipeline 114, 214. No cable or air supply is needed to perform valve movement and position monitoring.

Moreover, with the wireless technology, it is now possible to send the open/close command to the actuator 116, 217, 316 and receive feedback about the open and/or closed position of the valve 112, 212, 312 without cables or air supply. The communication with the actuator 116, 217, 316 and all the relevant equipment in the process control system 100, 200 described above is completely wireless with more diagnostic information acquired by the workstation and control station.

Said another way, integrating the wireless position monitor, e.g., such as Fisher 4320/TopWorx 4310 Wireless Position Monitor, with an on/off option, into the actuator system 110, 210, 310 allows remote operation of the valve 112, 212, 312 without any hardwired connection. This minimizes various problems, such as interference, deterioration, damage and/or failure, of any part of a hardwired connection, for example, while maintaining the functionality of any other wired components of the process control system 100, 200.

Still further, the wireless system includes many other benefits, such as improved worker and production efficiency and reduced lost batches. Moreover, the wireless system and method of present disclosure also reduce unwanted emissions and improve worker safety.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one example" or "an example" means that a particular element, feature, structure, or characteristic described in connection with the embodiment is included in at least one embodiment. The appearances of the phrase "in one example" in various places in the specification are not necessarily all referring to the same example.

Some examples may be described using the expression "coupled" and "connected" along with their derivatives. For example, some examples may be described using the term "coupled" to indicate that two or more elements are in direct physical or electrical contact. The term "coupled," however, may also mean that two or more elements are not in direct contact with each other, but yet still cooperate or interact with each other. The examples are not limited in this context.

As used herein, the terms "comprises," "comprising," "includes," "including," "has," "having" or any other variation thereof, are intended to cover a non-exclusive inclusion.

For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A gas-over-oil actuator system for use with a valve in a natural gas pipeline, the system comprising:
    a gas-over-oil actuator;
    a wireless position monitor operatively coupled to the gas-over-oil actuator, the wireless position monitor having an integral opened center spool valve and adapted to be communicatively coupled to a remote workstation;
    at least one switching relay operatively coupled to the gas-over-oil actuator and the wireless position monitor, the at least one switching relay for receiving a signal from the opened center spool valve of the wireless position monitor; and
    at least one torque limiting device disposed between the wireless position monitor and the at least one switching relay to prevent excess torque from the gas-over-oil actuator;
    wherein, upon wirelessly receiving a command from the remote workstation, the wireless position monitor drives a signal from the opened center spool valve to the at least one switching relay to manage pressure supply to the gas-over-oil actuator and to move the valve to a desired position.

2. The system of claim 1, wherein the gas-over-oil actuator further comprises a first gas/oil tank, a second gas/oil tank, and a manual override system disposed adjacent to and between the first and second gas/oil tanks.

3. The system of claim 1, further comprising an open switching relay and a closed switching relay, the open and closed switching relays operatively coupled to the gas-over-oil actuator and the wireless position monitor.

4. The system of claim 3, wherein the gas-over-oil actuator further comprises a first tank and a second tank, the first tank in communication with the open switching relay and the second tank in communication with the closed switching relay.

5. The system of claim 3, wherein each of the open and closed switching relays includes a vent.

6. The system of claim 1, wherein the signal from the opened center spool valve driven to the at least one switching relay is a low pressure signal, and the pressure supply to the gas-over-oil actuator is a high pressure supply.

7. The system of claim 1, wherein the signal from the opened center spool valve driven to the at least one switching relay is a high pressure signal, and the pressure supply to the gas-over-oil actuator is the same pressure level as the high pressure signal.

8. The system of claim 1, further including a pressure regulator operatively coupled to the wireless position monitor, the pressure regulator having a relief valve and for limiting the inlet pressure from the natural gas pipeline to the opened center spool valve of the wireless position monitor.

9. The system of claim 1, further including at least one solenoid valve disposed external to the wireless position monitor, the at least one solenoid valve driven by the wireless position monitor to provide high pressure gas supply from the natural gas pipeline through the opened center spool valve and into the at least one switching relay.

10. The system of claim 1, further comprising a bleed valve for maintaining the at least one switching relay in an open position for a time required by the valve to complete a desired travel distance, the bleed valve having a locking nut to prevent tampering and disposed within a lockable cabinet.

11. A process control system comprising:
    a valve installed in a natural gas pipeline;
    a gas-over-oil actuator system operatively coupled to the valve, the gas-over-oil actuator system including;
        a gas-over-oil actuator;
        a wireless position monitor operatively coupled to the gas-over-oil actuator, the wireless position monitor having an integral pneumatic pilot valve;
        at least one switching relay operatively coupled to the gas-over-oil actuator and the wireless position monitor, the at least one switching relay for receiving a signal from the pneumatic pilot valve of the wireless position monitor; and
        a bleed valve for maintaining the at least one switching relay in an open position for a time required by the valve to complete a desired travel distance, the bleed valve having a locking nut to prevent tampering and disposed within a lockable cabinet;
    a workstation having a controller communicatively coupled to the wireless position monitor via a wireless network;
    wherein, upon receiving a command from the controller via the wireless network, the wireless position monitor drives a signal from the pneumatic pilot valve to the at least one switching relay to manage pressure supply to the gas-over-oil actuator and move the valve to a desired position.

12. The process control system of claim 11, the workstation further comprises one or more of a network gateway communicatively coupled to the controller, a laptop coupled to the network gateway, a control panel operatively coupled to the controller, and an LCD screen operatively coupled to the controller.

13. The process control system of claim 11, further comprising an open switching relay and a closed switching relay, the open and closed switching relays operatively coupled to the gas-over-oil actuator and the wireless position monitor.

14. The process control system of claim 13, wherein the gas-over-oil actuator further comprises a first tank and a second tank, the first tank in communication with the open switching relay and the second tank in communication with the closed switching relay.

15. The process control system of claim 11, wherein the pneumatic pilot valve is an opened center spool valve, the signal driven to the at least one switching relay is a low pressure signal, and the pressure supply to the gas-over-oil actuator is a high pressure supply.

16. The process control system of claim 11, further including a pressure regulator operatively coupled to the wireless position monitor, the pressure regulator having a relief valve and for limiting the inlet pressure from the natural gas pipeline to the pneumatic pilot valve of the wireless position monitor.

17. The process control system of claim 11, further comprising a differential pressure transmitter operatively coupled to the gas-over-oil actuator to measure one or more of a differential pressure across the gas-over-oil actuator or an operating torque of the valve, the differential pressure transmitter communicatively coupled to the workstation via the wireless network and a gateway to allow data acquisition and feedback relative to the differential pressure across the gas-over-oil actuator or the operating torque of the valve.

18. The process control system of claim 11, further comprising a first pressure transmitter disposed within the natural gas pipeline upstream the valve to measure pressure upstream the valve, and a second pressure transmitter disposed within the natural gas pipeline downstream the valve to measure pressure downstream the valve, the first and second pressure transmitters communicatively coupled to the workstation via the wireless network to allow data acquisition and feedback relative to the pressure in the natural gas pipeline upstream and downstream the valve.

19. A wireless actuator system for use with a valve in a natural gas pipeline, the wireless actuator system comprising:
an actuator adapted to be operatively coupled to a valve disposed in a natural gas pipeline;
a wireless position monitor operatively coupled to the actuator, the wireless position monitor having an integral opened center spool valve and adapted to be communicatively coupled to a remote workstation via a wireless network;
at least one switching relay operatively coupled to the actuator and the wireless position monitor, the at least one switching relay for receiving a pressure signal from the opened center spool valve of the wireless position monitor; and
a differential pressure transmitter operatively coupled to the actuator to measure one or more of a differential pressure across the actuator or an operating torque of the valve, the differential pressure transmitter communicatively coupled to the workstation via the wireless network and a gateway to allow data acquisition and feedback relative to the differential pressure across the actuator or the operating torque of the valve,
wherein, upon receiving a wireless command from the remote workstation, the wireless position monitor drives the pressure signal from the opened center spool valve to the at least one switching relay to manage pressure supply to the actuator and move the valve to a desired position.

20. The wireless actuator system of claim 19, further comprising an open switching relay and a closed switching relay, the open and closed switching relays operatively coupled to the actuator and the wireless position monitor.

21. The wireless actuator system of claim 19, wherein the pressure signal from the opened center spool valve driven to the at least one switching relay is a low pressure signal, and the pressure supply to the actuator is a high pressure supply.

22. The system of claim 19, further including a pressure regulator operatively coupled to the wireless position monitor, the pressure regulator having a relief valve and for limiting the inlet pressure to the opened center spool valve of the wireless position monitor.

23. A method of operating a valve disposed within a natural gas pipeline, the method comprising:
integrating a wireless position monitor into an actuator operatively coupled to the valve, the wireless position monitor communicatively coupled to a workstation via a wireless network;
transmitting, via one or more transmitters, a command from a controller of the workstation to the wireless position monitor via the wireless network;
sending a pressure signal from a pneumatic pilot valve of the wireless position monitor to at least one switching relay upon receiving the command, the at least one switching relay operatively coupled to the wireless position monitor and the actuator;
preventing excess torque from the actuator via at least one torque limiting device disposed between and operatively coupled to the wireless position monitor and the at least one switching relay; and
managing a high pressure supply to the actuator via the at least one switching relay to move the valve to a desired position in response to the pressure signal received from the pneumatic pilot valve.

24. The method of claim 23, further comprising monitoring the position of one or more of the valve or the actuator via the wireless position monitor, wherein monitoring the position of one or more of the valve or the actuator via the wireless position monitor comprises acquiring data relative to one of the valve or the actuator, including data relative to a travel position or a stroke time, via the wireless position monitor, the wireless network, and the workstation.

25. The method of claim 23, further comprising maintaining the at least one switching relay in an open position for a time required by the valve to complete a desired travel distance via a bleed valve.

26. The method of claim 23, further comprising limiting an inlet pressure from the natural gas pipeline to the pneumatic pilot valve via a pressure regulator operatively coupled to the wireless position monitor.

27. The method of claim 23, further comprising measuring one or more of a differential pressure across the actuator or an operating torque of the valve, via a differential pressure transmitter operatively coupled to the actuator, the differential pressure transmitter communicatively coupled to the workstation via the wireless network to allow data acquisition and feedback relative to the differential pressure across the actuator or the operating torque of the valve.

28. The method of claim 23, further comprising measuring pressure upstream the valve and downstream the valve via a first pressure transmitter disposed upstream the valve and a second pressure transmitter disposed downstream the valve, respectively, the first and second pressure transmitters communicatively coupled to the workstation via the wireless network to allow data acquisition and feedback relative to the pressure in the natural gas pipeline upstream and downstream the valve.

29. A gas-over-oil actuator system for use with a valve in a natural gas pipeline, the system comprising:
a gas-over-oil actuator;
a wireless position monitor operatively coupled to the gas-over-oil actuator, the wireless position monitor having an integral opened center spool valve and adapted to be communicatively coupled to a remote workstation;

a solenoid valve system operatively coupled and external to the wireless position monitor, the solenoid valve system having at least one solenoid valve;

at least one switching relay operatively coupled to the gas-over-oil actuator and the wireless position monitor, the at least one switching relay for receiving a high pressure signal from the opened center spool valve of the wireless position monitor; and at least one torque limiting device disposed between the wireless position monitor and the at least one switching relay to prevent excess torque from the gas-over-oil actuator;

wherein, upon wirelessly receiving a command from the remote workstation, the wireless position monitor drives a high pressure signal from the solenoid valve system to the opened center spool valve and into the at least one switching relay to manage a high pressure supply having the same pressure as the high pressure signal to the gas-over-oil actuator.

* * * * *

UNITED STATES PATENT AND TRADEMARK OFFICE
CERTIFICATE OF CORRECTION

PATENT NO. : 9,958,880 B2
APPLICATION NO. : 14/933918
DATED : May 1, 2018
INVENTOR(S) : Andrea Tarantino et al.

Page 1 of 1

It is certified that error appears in the above-identified patent and that said Letters Patent is hereby corrected as shown below:

In the Specification

Column 7, Line 11, "gas-over-oil actuator 118" should be -- gas-over-oil actuator 116 --.

Column 7, Lines 14-15, "gas-over-oil actuator 118" should be -- gas-over-oil actuator 116 --.

Column 8, Line 53, "switching relay 128" should be -- switching relay 124 --.

Column 9, Line 23, "gas-over-oil actuator system 210." should be -- gas-over-oil actuator system 110. --.

In the Claims

Column 15, Line 66, "The system" should be -- The wireless actuator system --.

Signed and Sealed this
Thirteenth Day of August, 2019

Andrei Iancu
*Director of the United States Patent and Trademark Office*